United States Patent [19]
Vassiliou

[11] Patent Number: 5,390,824
[45] Date of Patent: Feb. 21, 1995

[54] MEASURING DISPENSER FOR ONE OR MORE LIQUIDS

[76] Inventor: Eustathios Vassiliou, 12 S. Townview La., Newark, Del. 19711

[21] Appl. No.: 110,587

[22] Filed: Aug. 23, 1993

Related U.S. Application Data

[63] Continuation-in-part of Ser. No. 55,139, Apr. 29, 1993, abandoned.

[51] Int. Cl.$^6$ ............................................. B67D 5/60
[52] U.S. Cl. ................................. 222/133; 222/451; 222/454; 222/83.5
[58] Field of Search ............... 222/129, 133, 441, 442, 222/451, 453, 456

[56] References Cited

U.S. PATENT DOCUMENTS

| | | |
|---|---|---|
| 1,053,316 | 2/1913 | Psikal . |
| 1,428,043 | 9/1922 | Lyons ................................. 222/133 |
| 1,671,405 | 5/1928 | Clark .............................. 222/133 X |
| 2,005,919 | 6/1935 | Militello ........................... 221/112 |
| 2,021,444 | 11/1935 | Duell ................................ 222/451 |
| 2,203,054 | 6/1940 | Holmes .......................... 222/453 X |
| 2,523,426 | 9/1950 | Gray ................................. 222/81 |
| 2,532,787 | 12/1950 | Romyns ......................... 222/453 X |
| 2,740,556 | 4/1956 | Baron .............................. 222/133 |
| 2,778,532 | 1/1957 | Raverty ............................ 222/89 |
| 2,837,250 | 6/1958 | Hagman ........................ 222/451 X |
| 3,141,585 | 7/1964 | Emmert ........................ 222/453 X |
| 3,341,088 | 9/1967 | Moynihan ....................... 222/440 |
| 3,358,886 | 12/1967 | Provenza .......................... 222/158 |
| 4,071,171 | 1/1978 | Bassignani .................... 222/439 X |
| 4,105,142 | 8/1978 | Morris .............................. 222/158 |
| 4,778,087 | 10/1988 | Desai ................................ 222/449 |
| 4,958,749 | 9/1990 | Kuenzel et al. ................. 222/454 X |
| 5,125,540 | 6/1992 | Rodriguez ..................... 222/447 X |
| 5,292,039 | 3/1994 | Neofitou ........................ 222/454 X |

*Primary Examiner*—Andres Kashnikow
*Assistant Examiner*—Kenneth DeRosa
*Attorney, Agent, or Firm*—E. Vassiliou

[57] ABSTRACT

A measuring dispenser for dispensing liquids from a single or multiple container is disclosed. In the case of single container, the container has a normally closed first valve, while a measuring cup connected to the container has a normally open second valve. These two valves are made to operate concurrently, so that when one valve is closed the other valve is open, and vice versa. The dispenser may also have a supplementary container with a third valve, which may be arranged to open and close independently of the other two valves, or preferably to be closed when the first valve is closed, and open when the first valve is open, and at the same time be adaptable to provide a liquid flow rate of a desired relation with respect to the liquid flow provided by the first valve.

6 Claims, 9 Drawing Sheets

FIG. 13
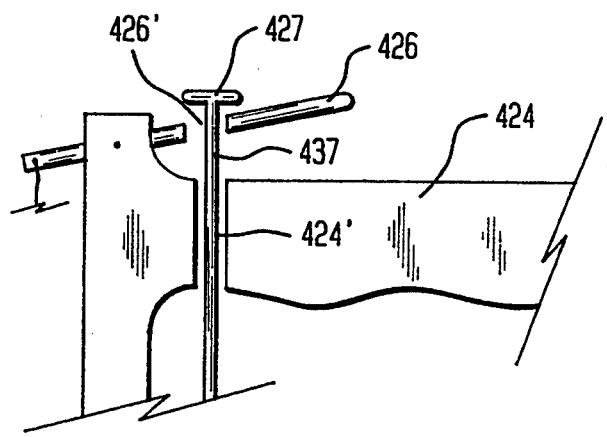
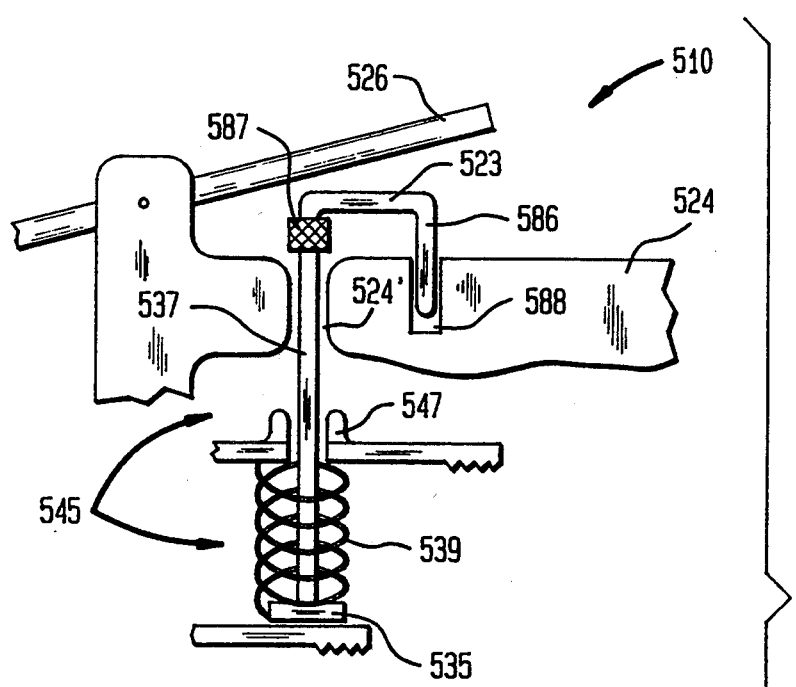
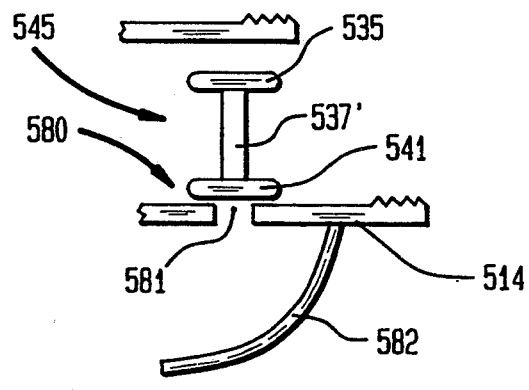
FIG. 14

MEASURING DISPENSER FOR ONE OR MORE LIQUIDS

This is a continuation-in-part of application Ser. No. 08/055,139, filed on Apr. 29, 1993, now abandoned.

FIELD OF THE INVENTION

The present invention relates to measuring dispensers. More particularly, the present invention relates to measuring dispensers for liquids wherein predetermined amounts of liquids can be consistently dispensed from one or more associated containers.

BACKGROUND OF THE INVENTION

The prior art is replete with devices for dispensing predetermined amounts of liquids and granular materials from associated containers. The crowded nature of the measuring dispenser art is indicative of the great effort which has been expended by prior art inventors to provide a device which can adequately dispense a desired amount of material from an associated container. However, despite this great effort, the measuring dispenser art has heretofore been devoid of a device for consistently dispensing predetermined amounts of liquid from a container on multiple occasions.

In this regard, there is a great need in the restaurant industry, for example, for a measuring dispenser which will permit liquid egg to be uniformly poured from a container in consistent amounts on multiple occasions. Typically, a cook in a restaurant is faced with the task of preparing a food dish which includes one egg, or multiples thereof, as an ingredient therein. Similarly, scrambled eggs and fried egg sandwiches are a common item on breakfast menus. It would be highly desirable if a cook had a device which would consistently and quickly permit liquid egg to be metered from a container in predetermined amounts.

The prior art has posed no solution whatsoever to the problem of providing consistent amounts of liquid egg on multiple occasions, and even more so in the case that it is desirable to dispense consistently, accurately, and conveniently, predetermined amounts of more than one liquids, such as egg-white and egg-yolk separately, for example.

Examples of known measuring dispensers for dispensing liquid from associated containers are shown in U.S. Pat. Nos. 4,778,087 to Desai and 4,105,142 to Morris Jr. Additionally, known measuring dispensers for dispensing granular material, such as soap or sugar, from an associated container or sugar bowl are shown in U.S. Pat. Nos. 3,358,886 to Provenza; 2,778,532 to Raverty. et al.; 2,005,919 to Militello; and 1,053,316 to Psikal. In the liquid dispensing devices of Desai and Morris Jr., the concept of dispensing fluids from a container for holding a metered amount of fluid therein is disclosed. However, neither of these devices are suitable for use with liquid eggs due to the viscosity of the eggs and the structure of the devices disclosed in such patents which would be difficult to clean after storing and dispensing liquid eggs.

The Provenza and Raverty et al patents disclose devices having structures which are sufficient for dispensing granular material from an associated container. However, both of these devices are insufficient for dispensing a liquid product, such as liquid eggs, from an associated container as a result of the structure and operation of the value system associated with such measuring dispensers. Accordingly, there has been a considerable need for an improved measuring dispenser for permitting liquid, such as liquid egg, to be sufficiently stored in a container for a prolonged period of time and for dispensing such liquid therefrom in consistent amounts.

The present invention solves all of the aforementioned problems and will thus greatly benefit all those who have a need to uniformly and efficiently dispense predetermined metered portions of one or two liquids from respective associated container(s).

SUMMARY AND OBJECTS OF THE INVENTION

For clarity purposes, the present invention may be divided into two categories, which will be discussed separately, and in sequence. The first category deals with devices intended to dispense a liquid (referred to as "first liquid") and comprise a container (referred to as "first container"), from which the first liquid is to be dispensed. The second category deals with devices intended to dispense at least two liquids (referred to as "second liquid" in the case of two liquids), and at least an additional container (referred to as "supplementary container"), from which the second liquid is to be dispensed.

In the case of the first category, one aspect of the present invention pertains to a measuring dispenser for dispensing a first liquid from a first container. The measuring dispenser comprises first valve means having a normally closed configuration with respect to the first container for selectively releasing a predetermined amount of the first liquid stored within the first container upon movement of the first valve means from its normally closed configuration to an opened configuration. The measuring dispenser also includes metering means arranged downstream of the first valve means for receiving and selectively retaining the predetermined amount of the first liquid therein. A second valve means is operatively associated with the metering means and is arranged in a normally opened configuration therewith for selectively releasing the predetermined amount of liquid from the metering means. The measuring dispenser also includes valve control means for controlling the first and second valve means so as to selectively actuate the first valve means from its closed configuration to its opened configuration upon simultaneously actuating the second valve means from its normally opened configuration to a closed configuration.

In one preferred embodiment, the first valve means comprises sealing means for preserving the freshness of the first liquid within the first container when the first valve means is in its normally closed configuration. The sealing means may comprise a nipple having an entrance and an exit passageway therein.

Desirably, the metering means may include a measuring cup in combination with the second valve means. The second valve means may include a first plunger mechanism, a hinge joint or other valve mechanism adapted for movement from an opened configuration to a closed configuration.

In another preferred embodiment, the measuring dispenser comprises mounting means having at least one main passageway therein. When in an assembled position, the mount is arranged on a top portion of the first container and the at least one main passageway is aligned with at least one opening in the top portion of the first container. In this embodiment, it is preferable for the first valve means to be arranged adjacent the at least one main passageway in the mounting means.

It is also preferable for the measuring dispenser to comprise support means extending from the mounting means for supporting the first container when the first liquid is being poured therefrom. The support means may comprise a plurality of rigid panels, wherein each of the rigid panels are arranged adjacent corresponding sides of the first container in assembled position. In this embodiment, the rigid panels may be hingedly or detachably connected to each other or to the mounting means so that the first container can be easily placed therein.

In another embodiment, the support means may comprise at least one flexible web detachably connectable, such as by velcro means, to the mounting means. In this embodiment, the flexible web is most preferably arranged adjacent at least three sides of the first container.

In yet another preferred embodiment, the measuring dispenser further comprises size adjusting means operatively connected to the support means for accommodating various sized containers. The size adjusting means may comprise a spring, arranged under compression, between a bottom panel of the support means and the bottom of the first container.

In another preferred embodiment, the measuring dispenser comprises stabilizing means for stabilizing the mount with respect to the first container. The stabilizing means may comprise first container top support means connected to the mounting means for stabilizing the mounting means with respect to the top portion of the first container. The first container top support means preferably includes a first side adapted to correspond with the shape of the top portion of the first container and a second side adapted to correspond with the shape of the mounting means. When placed in assembled position on the first container, the first container top support means is arranged adjacent the top portion thereof.

In another preferred embodiment, the stabilizing means may also comprise at least one piercing member which is insertable within the first container top support means. In this embodiment, it is preferable for the top portion of the first container to have a generally triangular shape and to include a vertically oriented central tabbed area thereon. This is the type of cardboard container often used to retain liquid egg products, milk, orange juice, and the like. Most preferably, the at least one piercing member is adapted to pierce the vertically oriented tabbed area when arranged in assembled position.

The measuring dispenser of the present invention may also comprise piercing means for piercing the top portion of the first container and permitting the first liquid to flow therethrough. Most preferably, the piercing means includes a hollow passageway through which the first liquid is permitted to flow.

Another preferred embodiment of the measuring dispenser comprises flow facilitation means for facilitating the displacement of the first liquid from the first container. The flow facilitation means may comprise a through-hole for permitting air to enter the first container so that the flow of the first liquid is enhanced through the main passageway and the first valve means.

In another preferred embodiment of the present invention, the measuring dispenser comprises mounting means having a proximal end and a distal end wherein at least one main passageway is arranged within the mounting means. In this preferred embodiment, the measuring dispenser comprises a measuring cup connected to the distal end of the mounting means. The measuring cup is arranged downstream of the at least one main passageway and includes a selectively sealable drainage hole therein to thus permit the measuring cup to receive and selectively retain a predetermined amount of first liquid. It is also preferable for the measuring dispenser to comprise valve control means, such as first trigger means, operatively connected to the first and second valve means for selectively and alternatively actuating the respective valve means to opened and closed configurations so that the first liquid within the first container can be poured into and retained in the measuring cup until the predetermined amount is obtained. The second valve means is then permitted to return to its normally opened configuration and the predetermined amount of the first liquid is permitted to flow through the drainage hole of the measuring cup.

In another preferred embodiment the second valve means includes a hinge joint arranged to connect the measuring cup to the first container. When the second valve means is actuated from its normally "closed" configuration to its "opened" configuration, the measuring cup pivots about the hinge joint until the open side of the measuring cup has been tilted at an angle of at least 90 degrees with respect to its normally "closed" configuration.

In yet another preferred embodiment, the measuring cup may comprise a translucent material to aid a user in clearly ascertaining when the desired amount of first liquid is poured therein.

In another preferred embodiment, the first valve means may comprise a nipple extending at least partially into the main passageway of the mounting means. The nipple is made of flexible material such as plasticized PVC or an elastomer including natural or synthetic rubber or a fluorinated elastomer, e.g., Viton and the like. The nipple preferably includes a plurality of openings wherein at least one of the openings is arranged to face the measuring cup.

The present invention is also directed to a second category of dispensers having more than one container in order to be capable of dispensing more than one liquids, as aforementioned. Thus, according to a preferred embodiment of the second category, there is provided a dispenser, which is similar in many aspects with the dispensers belonging to the first category, described thus far, but it has more than one containers. In the case that it is desirable to be able to dispense two liquids, for example, the dispenser, in addition to the first container, further comprises a supplementary container adaptable to contain and dispense a second liquid. The supplementary container comprises third valve means having a normally closed configuration for selectively releasing a flow of the second liquid upon opening the third valve means.

The third valve means may be adaptable to obtain the open and closed configuration independently of the configuration of the first and second valve means, or they may be adaptable to obtain the open and closed configuration in coordination with the configuration of the first and second valve means.

It is preferable that the third valve means are adaptable to obtain the open and closed configuration substantially concurrently and respectively with the open and closed configuration of the first valve means. It is even more preferable that the third valve means are adaptable, when in open configuration, to provide a flow rate to the second liquid in a desired ratio with respect to the flow rate provided to the first liquid by the first valve means, when in open configuration. It is further preferable that the third valve means, when in open configuration, provide a flow rate to the second liquid in the range of 2 to 5 times, and more preferable in the range of 2.5 to 3.5 times, the flow rate provided to the first liquid by the first valve means, when in open configuration.

It is also preferable that the supplementary container is concentric with and surrounds the first container.

Finally, it is preferred that the first liquid in the first container is egg-yolk, and the second liquid in the supplementary container is egg-white.

Accordingly, it is an object of the present invention to provide a measuring dispenser for consistently metering a predetermined amount of a liquid from an associated container.

It is another object of the present invention to provide a measuring dispenser wherein the liquid which is stored therein can be quickly and efficiently dispensed in predetermined metered amounts.

It is another object of the present invention to provide a measuring dispenser which is easy to clean and which can be manufactured at a low cost.

It is still another object of the present invention to provide a measuring dispenser which will effectively preserve the freshness of a liquid stored within an associated container.

It is yet another object of the present invention to provide a measuring dispenser having a first valve means adjacent a first container and a second valve means adjacent a measuring cup wherein the first valve means is arranged in a normally closed configuration with respect to an associated passageway of the first container, and wherein the second valve means is normally arranged in an opened configuration with respect to a measuring cup. The first and second valve means are simultaneously and alternatively actuated by valve control means.

It is further another object of the present invention to provide a measuring dispenser having more than one containers for dispensing correspondingly more than one liquids in a controllable manner as described herewith.

It should be understood, that the aforementioned objects should not be taken as restricting the scope of the present invention. Thus, certain objects may be compromised, and even sacrificed partially or totally in favor of alternative ones, if so desired.

BRIEF DESCRIPTION OF THE DRAWINGS

The above description, as well as further objects, features and advantages of the present invention will be more fully understood with reference to the following detailed description of a measuring dispenser for liquids, when taken in conjunction with the accompanying drawings wherein:

FIG. 13 shows schematically a fractional view of a different embodiment, wherein the upper trigger rod passes through the handle and the lever of the two-liquid dispenser, and it ends to a push button.

FIG. 14 shows schematically a fractional view of still a different embodiment, wherein the upper rod ends to a pull-trigger between the handle and the lever of the two-liquid dispenser.

DETAILED DESCRIPTION OF THE PREFERRED EMBODIMENTS

In accordance with one preferred embodiment of the first category of the present invention, a measuring dispenser generally designated 10 is clearly disclosed in FIGS. 1–5. As can be appreciated with reference to FIG. 1, the measuring dispenser 10 is designed to be placed in an assembled position on an associated first container 12.

The first container 12 is adapted to retain a first liquid L, such as liquid egg product, therein. It should be understood that the present invention is particularly useful for dispensing liquid egg; however, the measuring dispenser 10 can be used for accurately and consistently dispensing many other liquids.

Figures 4, 5:
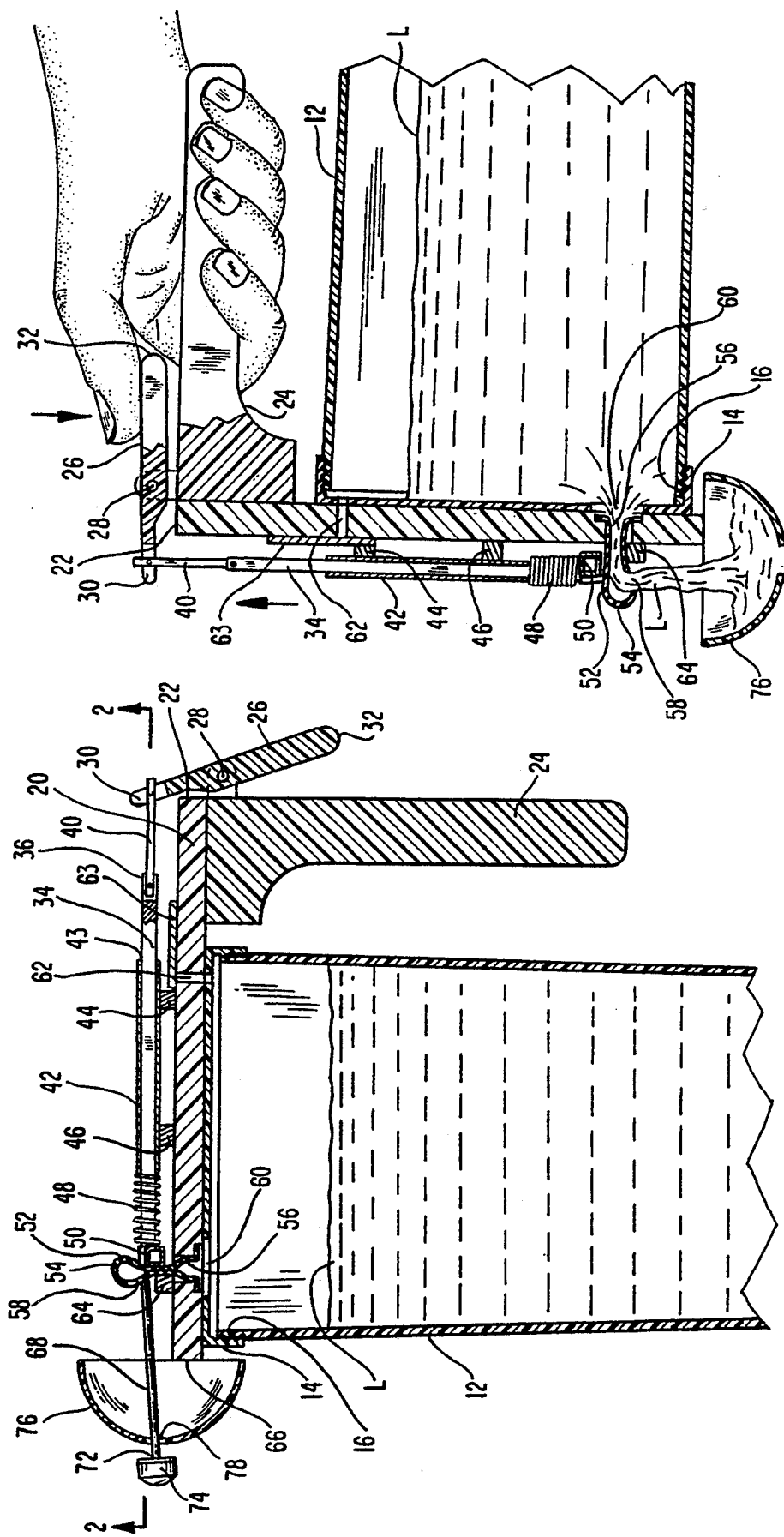
FIG. 4 is a side cross sectional view of the measuring dispenser taken along line 4—4 as shown in FIG. 2 in assembled position on an associated first container.
FIG. 5 is a side cross sectional view of the measuring dispenser taken along line 5—5 as shown in FIG. 3 in assembled position on an associated container.
Figure 6:
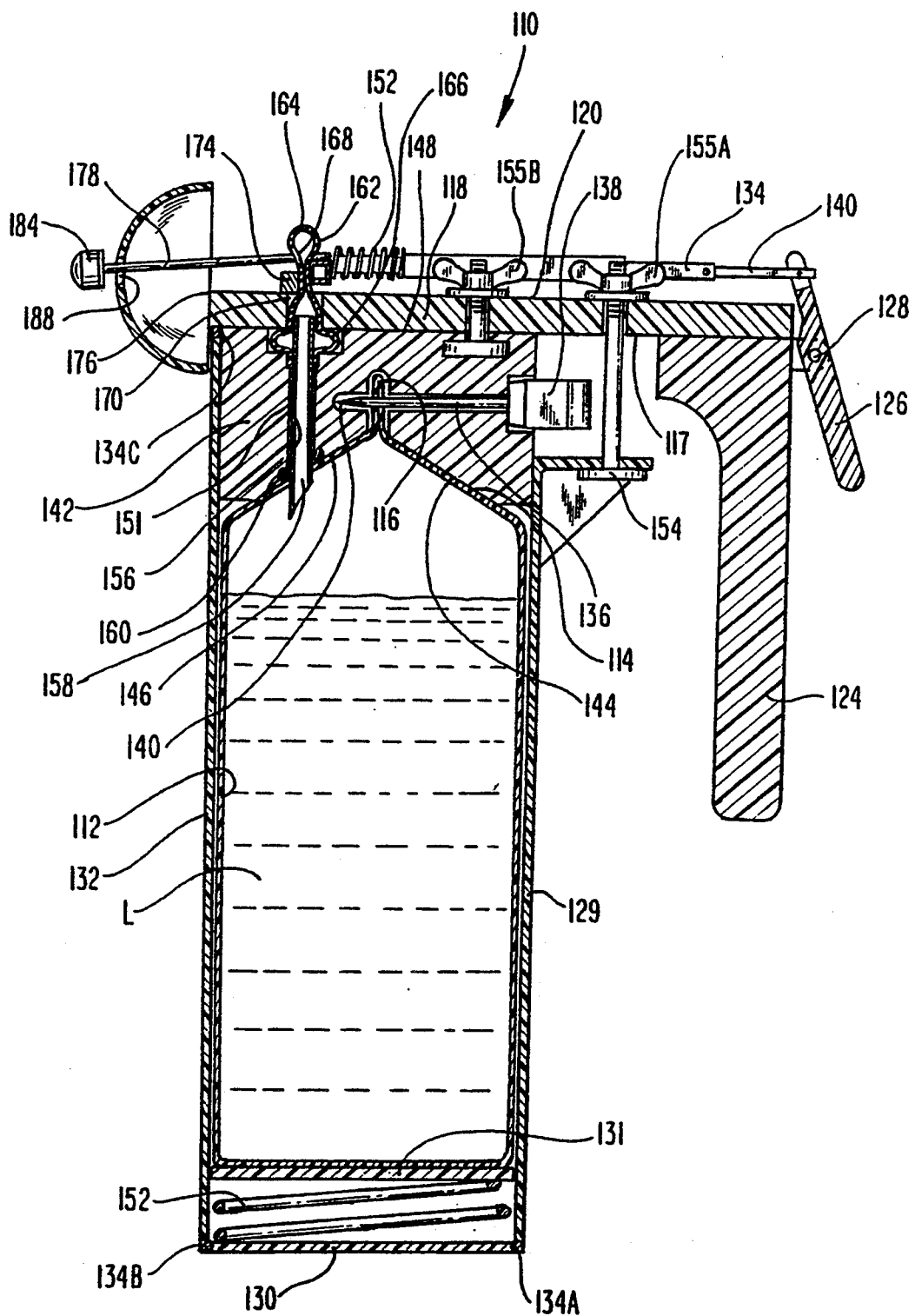
FIG. 6 is a side view of a second embodiment of the measuring dispenser of the present invention in its normally closed position and assembled on an associated first container.
Figure 8:
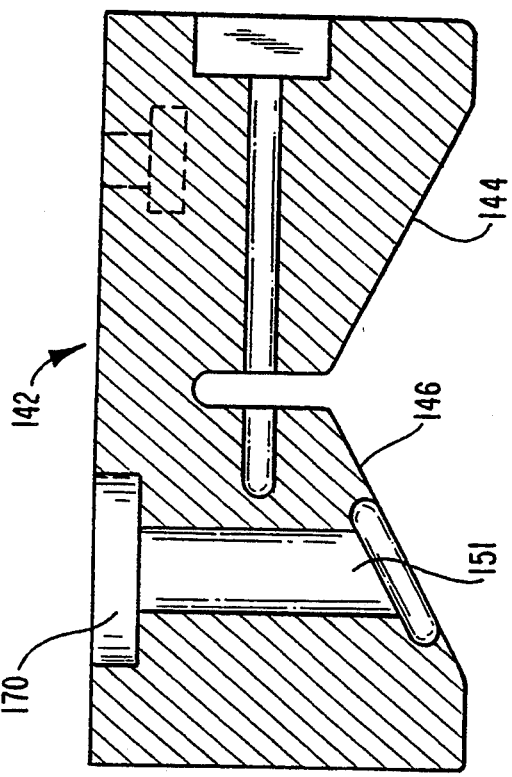
FIG. 8 is a side cross sectional view of the portion of the measuring dispenser shown in FIG. 7.
Figure 7:
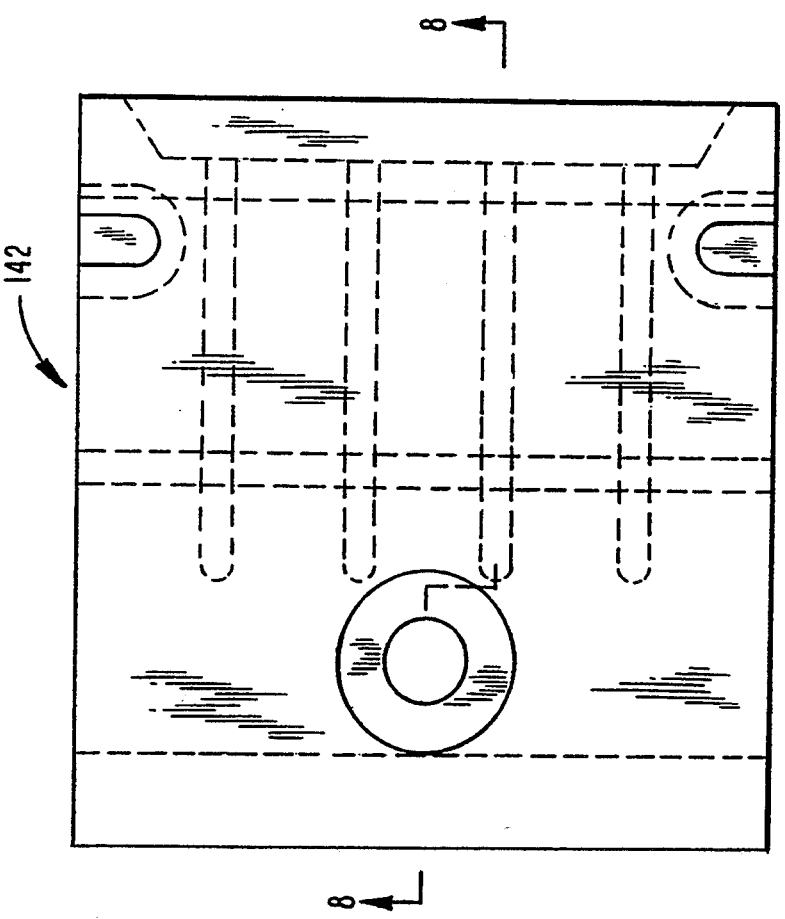
FIG. 7 is a cross sectional top plan view of a portion of the measuring dispenser shown in FIG. 6.

In the embodiment shown in FIGS. 1–5, the first container 12 includes a circular lid 14 which forms an integral part of the measuring dispenser 10. However, as shown in FIGS. 6–8, it should be appreciated that the lid 14 may be separable from the dispenser 10. As best shown in FIGS. 4 and 5, the lid 14 includes a plurality of internal threads 16 which are adapted to become engaged with corresponding threads arranged on a top portion of the first container 12; thus, securely mounting the lid 14 thereon. However, the lid 14 may also be press-fitted onto the top portion of the first container 12 or may be integral therewith and thus, the threads 16 are an optional feature thereof.

In the preferred embodiment of the measuring dispenser 10, shown in FIGS. 1–5, a mount 18 is provided, having in this particular case a rectangular shape and includes a top surface 20 on which a first trigger system 25, i.e. valve control means, described in more detail below, is assembled. The mount 18 also defines a proximal end 22 and a distal end 66 spaced from the proximal end. A handle 24 is connected to the bottom surface of the mount 18 and extends downwardly, parallel with the sides of the first container 12. As can be appreciated, the handle 24 permits easy handling and enhances the use of the measuring dispenser 10.

The unique first trigger system 25 of the measuring dispenser 10 includes a plurality of elements adapted to selectively permit liquid to be poured out of an associated first container in consistently premeasured amounts. More particularly, the first trigger system 25 comprises a lever 26 pivotally connected at pivot joint 28 to the proximal end 22 of the mount 18. This feature of the present invention can best be appreciated with reference to FIGS. 4 and 5.

Figure 1:
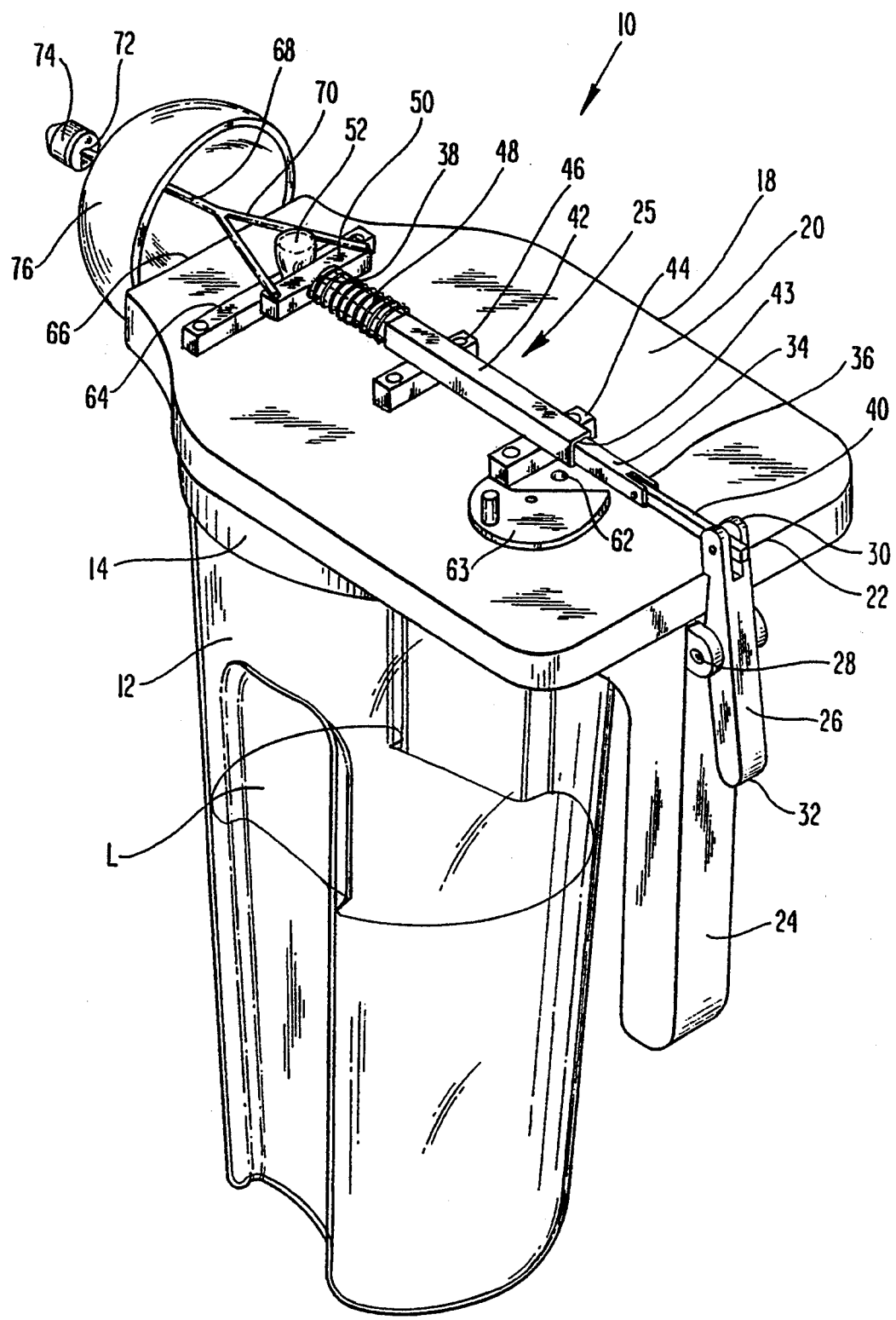
FIG. 1 is a perspective view of the present measuring dispenser in its normally closed position assembled on an associated first container.

The lever 26 includes an upper end 30, arranged adjacent the top surface 20 of the mount 18, and a lower end 32 spaced from upper end 30. When the lever is in its normal undepressed position, it extends downwardly at an obtuse angle with respect to the top surface 20 of the mount 18, and the first trigger system 25 can be said to be in its normal unactuated position, as best shown in FIGS. 1 and 4. However, when the lever 26 is depressed by a person who desires to use the measuring dispenser 18, it is moved to a substantially vertical position, and the first trigger system 25 can be said to be in its actuated position as shown in FIG. 5.

The first trigger system 25 also includes an elongate release bar 34 arranged to extend generally parallel to the top surface 20 of the mount 18 as can best be appreciated with reference to FIGS. 4 and 5. Most preferably, the elongate release bar 34 is constructed of a rigid material, such as plastic, metal, wood, or the like. The elongate release bar includes a proximal end 36 which is attached to the upper end 30 of the lever 26 via a connector 40, and a distal end 38 spaced from the proximal end 36.

Figure 3:
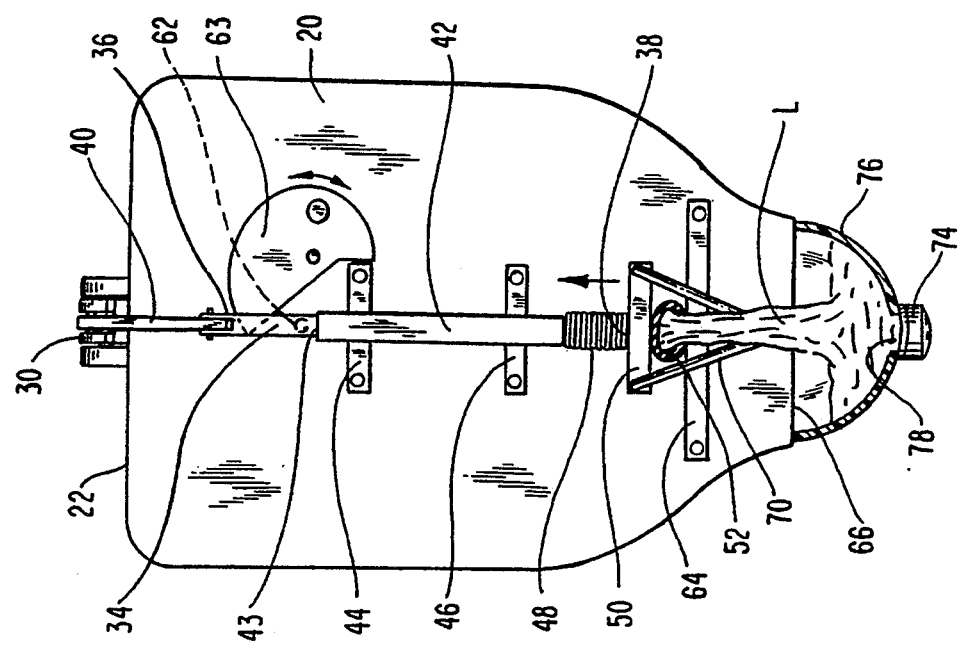
FIG. 3 is a top plan view of the measuring dispenser shown in FIG. 1 with the valve control means arranged in its actuated position.
Figure 2:
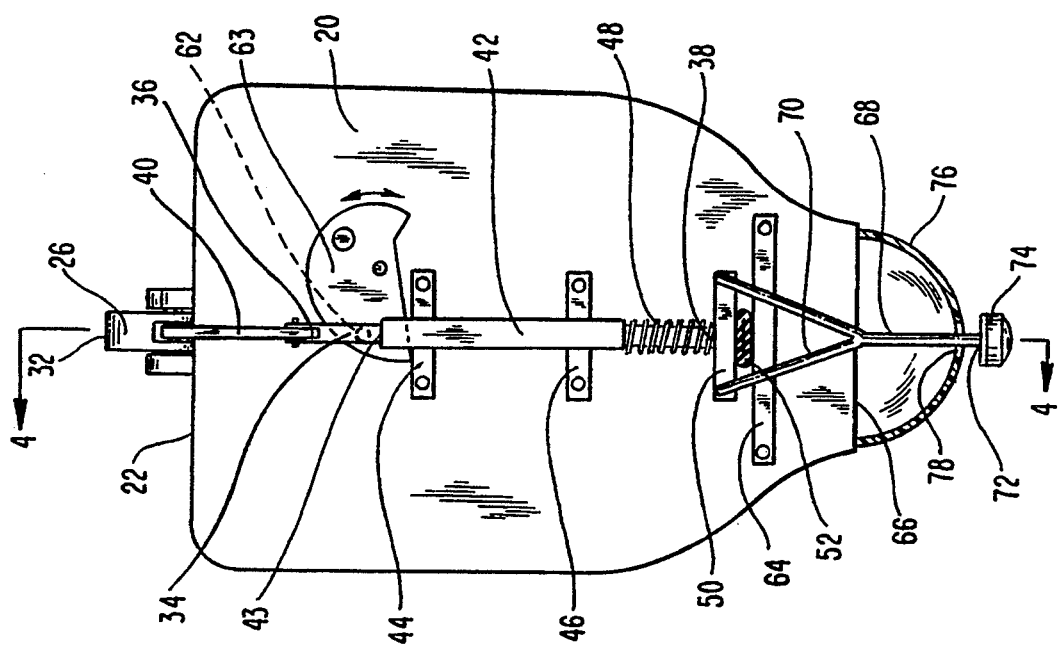
FIG. 2 is a top plan view of the measuring dispenser shown in FIG. 1 with the valve control means arranged in its normally unactuated position.

The first trigger system 25 also includes a hollow elongate sleeve 42 having a sized opening 43 therethrough which is adapted to receive and permit slidable movement of the elongate release bar 34 therein. Preferably, the elongate sleeve 42 is also constructed of rigid material which is compatible with the material of the release bar 34. As shown in FIGS. 1-3, the first trigger system 25 includes first and second transverse sleeve mounts 44 and 46, respectively, for securing the elongate sleeve 42 to the top surface 20 of the mount 18. The first and second transverse sleeve mounts 44 and 46 are preferably integrally constructed with the elongate sleeve 42 although, they may be separable therefrom while still sufficiently securing the elongate sleeve 42 to the top surface 20 of the mount 18.

A transverse compression bar 50 is securely fixed to the proximal end 36 of the release bar 34. As best shown in FIGS. 1-5, a first compression spring 48 is arranged on the elongate release bar 34 and extends between the sleeve 42 and the compression bar 50, in a manner to bias the compression bar 50 toward the distal end 66 of the mount 18. As with the distal end 38 of the elongate release bar 34, the transverse compression bar 50 is adapted for relative slidable movement with respect to the elongate sleeve 42.

A main passageway 60 is arranged to extend end-to-end between the top and bottom surfaces of the mount 18 at a location closer to the distal end 66 than to the proximal end 22. As can be appreciated, the main passageway 60 can be positioned at any location in the mount 18; however, most preferably, the main passageway 60 is arranged substantially adjacent to the distal-most end of the mount 18 to facilitate the removal of liquid from an associated first container 12. A nipple 52 is arranged to extend into the main passageway 60 of the mount 18. As clearly shown in FIGS. 4 and 5, the nipple 52 includes an upper end 54 and a lower end 56, wherein the lower end is securely connected to inner walls which define the main passageway 60 within the mount 18. The upper end 54 of the nipple 52 includes a discharge opening 58 facing the distal end 66 of the mount 18. At the distal-most side of the main passageway 60 and adjacent thereto, a rigid stopper bar 64 is secured to the top surface 20 of the mount 18. Thus, permitting the nipple 52 to be selectively opened and closed with respect to the main passageway 60, thereby acting as a first valve means, as will be discussed in more detail when the operation of the present measuring dispenser 10 is discussed hereinbelow.

A measuring cup 76 having a concave inner surface and a convex outer surface is preferably fixed to the distal-most end of the mount 18. This feature of the present invention is clearly shown in FIGS. 1-5. The measuring cup 76 is sized and shaped to accommodate a predetermined portion of the first liquid, such as liquid egg, at any given time, and may have graduations thereon to permit a user to accurately determine when the desired predetermined amount of the first liquid has been placed therein. The measuring cup 76 includes a first liquid flow passageway 78 therein at a central location thereof. The first liquid flow passageway 78 is sized so that liquid egg stored within the measuring cup 76 can adequately flow therefrom. As best appreciated from FIGS. 1-3, the first trigger system 25 also includes a connecting bar 68 having a V-shaped proximal portion 70 thereon which is fixed to the transverse compression bar 50. The connecting bar 68 also includes an elongate distal portion 72 which is sized and shaped to extend through the first liquid flow passageway 78 at the distal most end of the measuring cup 76.

The final component of the first trigger system 25 is a first plunger 74 which is secured to the elongate distal portion 72 of the connecting bar 68 at the convex side of the measuring cup 76. The first plunger 74 is sized and shaped to adequately cover the entire first liquid flow passageway 78 so that liquid can selectively be stored therein when the first trigger system 25 is actuated; thus, placing the first plunger 74 in a blocking position with respect to the first liquid flow passageway 78. Most preferably, the first plunger 74 is made of a relatively water-impervious material so that the portion of the first liquid, which is temporarily stored in the measuring cup 76, will not leak therefrom when the first plunger 74 is arranged in its blocking position.

In the preferred embodiment of the present invention shown in FIGS. 1-5, the mount 18 and the lid 14 include an aligned first air vent 62 which is adapted to permit air to enter into the first container so that the first liquid can readily be poured therefrom through main passageway 60 and the hollow nipple 52. Thus, the first air vent 62 serves as a flow facilitation means. A sealing member 63 may be slidably and pivotally connected to the top surface of the mount 18, with respect to the first air vent 62, so that the first air vent 62 can be selectively exposed when a user desires to pour the first liquid L from the first container 12. When the first liquid L is not being poured from the first container 12, the slidable sealing member 63 may be placed over the first air vent 62 so that the freshness of the first liquid can be preserved. This feature of the present invention can best be appreciated from FIGS. 2 and 3.

It should be understood that different elements of the dispenser which are shown to be rigidly supported on each other, may also be integral parts of each other in a more complex molded or formed configuration of plastic or metal, for example. Even certain pivotally connected elements may be integral part of each other, if the situation permits, such as for example, in the case of two thick rigid plastic elements connected together through a section of the same plastic, which section is flexible because it is made very thin, and which may be used as a pivot.

In operation, the measuring dispenser 10, including the lid 14, can be secured onto the top of the first container 12, which is filled with a first liquid L, so that the first liquid can be preserved therein. When the first liquid L is retained within the first container 12, the top surface 20 of the mount 18 is arranged in a generally horizontal position on top of the first container 12. In its normal position, i.e., when no pressure is applied to the lever 26, the nipple 52 is retained in a closed position, thereby preserving the freshness of the first liquid L and preventing the same from flowing through the main passageway 60. This feature of the present invention is best shown in FIGS. 2 and 4. Additionally, the first plunger 74 is retained in a normally open position with respect to the associated first liquid flow passageway 78 in the measuring cup 76. Thus, when the measuring dispenser 10 is in its normal position, none of the first liquid L will be permitted to flow through the main passageway 60 irrespective of the position of the measuring dispenser 10. As shown in FIG. 4, when the first trigger system 25 is left in its normal unactuated position, the nipple 52 is retained in its closed position as the first compression spring 48 exerts a force upon the transverse compression bar 50 which, in turn, compresses the nipple 52 against the stopper bar 64.

When one desires to pour the first liquid L out of the first container 12 in a predetermined portion, as defined by the interior volume of the measuring cup 76, the first container is easily manipulated by using the handle 24. The first container 12 is then tilted forwardly, as if the first liquid L were being poured from a pitcher, so that the top surface 20 of the mount 18 begins to move toward a vertical plane. At this time, the first liquid L approaches the passageway 60 in the mount 18. Of course, the degree which the first container 12 must be tilted, is directly dependent upon the amount of first liquid L therein and the location of the main passageway 60 within the mount 18.

Pressure is then applied to the lower end 32 of the lever 26 which will actuate the lever 26 to pivot about the pivot joint 28. This will exert a force on the connector 40, between the proximal end 36 of the release bar 34 and the upper end 30 of the lever 26, sufficient to pull the elongate release bar 34 so that it slides within the opening 43 in the sleeve 42 toward the proximal end 22 of the mount 18. Such movement of the release bar 34 will act on the transverse compression bar 50 forcing the same to slide toward the sleeve 42; thus, compressing the spring 48 therebetween. At this time, the first trigger system 25 has been fully actuated and the nipple 52 then automatically expands to its opened position as shown in FIGS. 3 and 5.

As the transverse compression bar 50 slides toward the sleeve 42, the connecting bar 68 and the v-shaped proximal portion 70 thereof is also pulled in a proximal direction. Thus, the first plunger 74, i.e., the second valve means, is actuated from its normally opened position to its closed position adjacent the first liquid flow passageway 78 in the central portion of the measuring cup 76. It should be understood that all components of the first trigger system 25 are interconnected from the proximal-most element, i.e., the lever 26, to the distal-most element, i.e., the first plunger 74, and thus, the actuation of the first plunger 74 from its opened position to its closed position occurs simultaneously with the expansion of the nipple 52 from its normally closed position to its opened position.

When the nipple 52 is arranged in its opened position with respect to the main passageway 60, the first liquid L is then permitted to flow through the main passageway 60 and out of the discharge opening 58 in the upper end 54 of the nipple 52. The first liquid L should continuously be poured from the first container 12 until it reaches a predetermined level within the concave measuring cup 76. Of course, the first plunger 74 is still retained in its blocking position with respect to the first liquid fluid passageway 78 in the measuring cup 76.

When a predetermined amount of the first liquid has been transferred into the measuring cup 76, the first trigger system 25 is released from its actuated position and is permitted to return to its normal unactuated position. At this time, the first and second valves, i.e., the nipple 52 and the first plunger 74, are simultaneously released to their normally closed and opened positions, respectively. Thus, the first liquid L within the measuring cup 76 is permitted to flow through the first liquid flow passageway 78 therein while the remaining first liquid L in the first container 12 is no longer permitted to flow therefrom due to the closed nature of the nipple 52 with respect to the main passageway 60 in the mount 18. In a preferred embodiment, a first air vent 62 is arranged to extend through the lid 14 and the mount 18 so that the first liquid L within the first container 12 can efficiently flow therefrom. The slidable sealing device 63 can optionally be used to selectively block and open the first air vent 62 to further preserve the freshness of the first liquid L stored within the first container 12 when the measuring dispenser 10 is not in use.

By operating the measuring dispenser 10 in the manner described above, a user can accurately, efficiently and consistently meter predetermined portions of the first liquid L for use in recipes, etc.

According to a second preferred embodiment of the present invention, the measuring dispenser is generally designated 110 in FIG. 6. The trigger system of the measuring dispenser 110 has substantially the same structure and operation as that of the first trigger system 25 of the measuring dispenser 10 and thus, this feature of the present invention will not be again described with detail herein. For example, according to this embodiment of the present invention, the trigger system is again partially arranged on a top surface 120 of a central mount 118. However, certain structural features of the measuring dispenser 110 are different from the measuring dispenser 10 and thus, these features will now be addressed.

In particular, the measuring dispenser 110 is particularly adapted for use with a carton 112. The carton 112 has the well known shape of treated cardboard cartons which are used to hold various food products such as prepackaged liquid egg products, milk, orange juice and the like. The carton 112 thus has a generally triangular-shaped top portion 114 and a vertically oriented tab 116 extending upwardly at the center of top portion 114 as clearly shown in FIG. 6.

A plurality of support panels including a proximal support panel 129, a bottom support panel 130 and a distal support panel 132, are arranged to form an open-ended housing adapted to support the first container 112 therein. Optionally, the support panels may be hingedly or detachably connected to each other as shown, for example, in FIG. 6. More particularly, in a detachable embodiment, the proximal and distal support panels 129 and 132 are arranged to oppose each other and are detachably connected to the mount 118 by wing nut assembly 155A and connection port 134c. The bottom support panel 130 is arranged to extend between the proximal support panel 129 and the distal support panel 132 and may be detachably connected thereto at connection ports 134a and 134b.

The measuring dispenser 118 also includes a plurality of securing or piercing prongs 136 which are used as stabilizing means. The securing prongs 136 include a gripping portion 138 adapted to be grasped so that the securing prongs 136 can be moved into and out of assembled position. The securing prongs 136 also include a distal end 140 defining a plurality of piercing points. In assembled position, the piercing prongs 136 extend through the vertically oriented tab 116 on the top portion 114 of the carton 112; thus, securing the carton 112 in assembled position with respect to the mount 110. In one preferred embodiment, the plurality of piercing prongs 136 comprise four parallel prongs as best appreciated from FIG. 7. However, as can be appreciated, any number of prongs or other members adapted for connection to the vertical tab 116, may be used. As will be described in more detail below, the piercing prongs 136 are arranged within a further stabilizing member 142.

Figure 9:
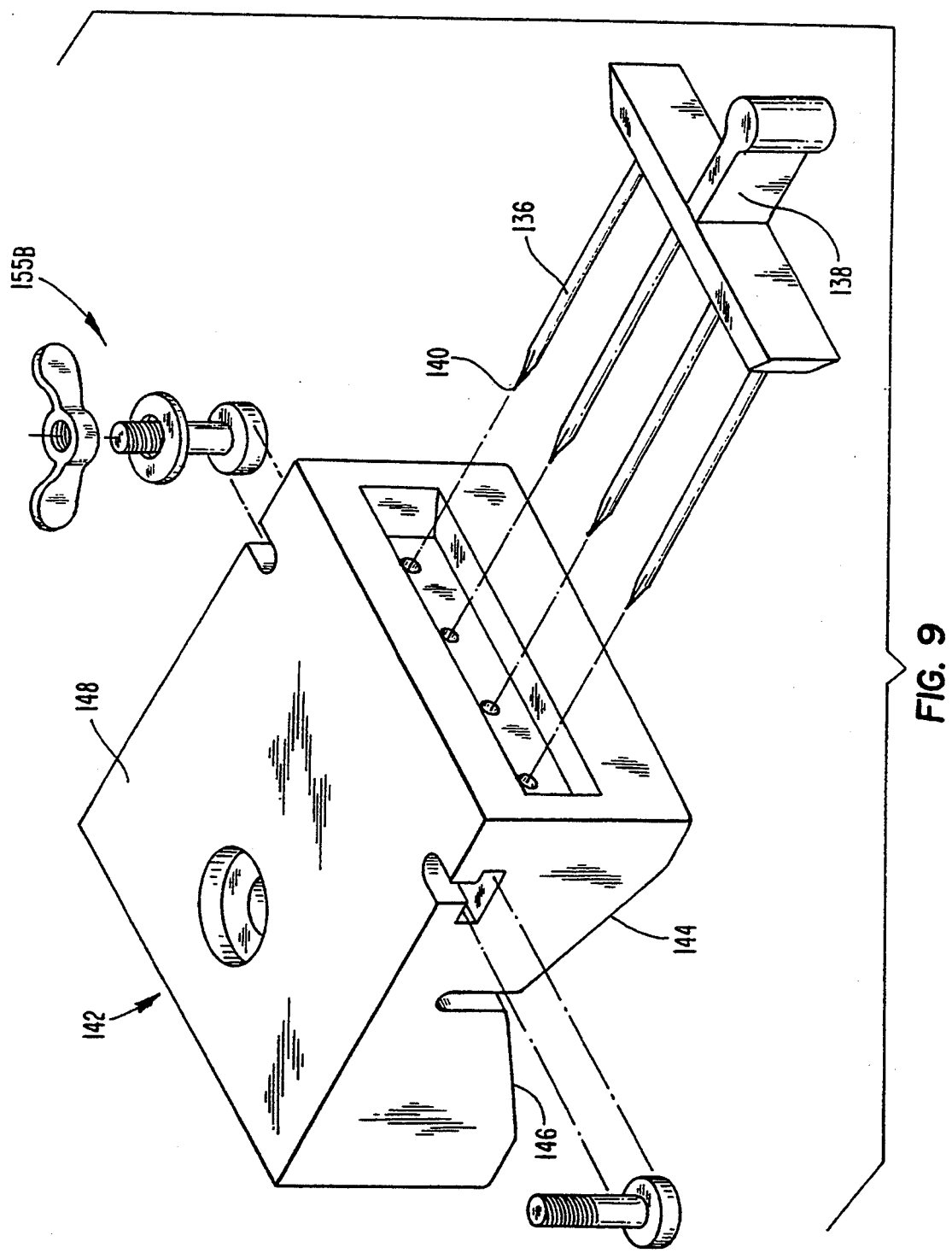
FIG. 9 is a perspective view of the portion of the measuring dispenser shown in FIGS. 7 and 8.

As best shown in FIGS. 6, 8 and 9, the stabilizing member 142 includes a proximal angled side 144 adapted to rest on the proximal end of the top portion 114 of the carton 112, and a distal angled side 146 adapted to rest on the distal end of the top portion 114 of the first container 112. The stabilizing member 142 may be constructed of any suitable material including plastic, wood, foam, metal or the like. The stabilizing member 142 also includes a top portion 148 which is detachably mounted to the bottom portion of the mount 118 by wing nut assembly 155B. In one preferred embodiment, wing nut assemblies 155A and 155B are adapted to extend through the mount 118 to secure the same to the proximal support panel 129 and the stabilizing member 142, respectively. However, it should be understood that various types of mounting means for detachably mounting the mount 118 to the stabilizing member 142 and the proximal support panel 129 can be used.

As best appreciated in FIG. 6, a size adjusting compression spring 152 is arranged between the fixed bottom support panel 130 and a vertically slidable bottom panel 131 adapted for flush engagement with the bottom of the first container 112. The size adjusting compression spring 152 permits a wide range of carton sizes to be securely placed within the plurality of support panels 129, 130 and 132. As can be appreciated, other size adjusting means besides the size adjusting compression spring 152 are contemplated within the scope of the present invention. For example, the bottom panel 130 may itself be vertically slidable with respect to the proximal support panel 129 and the distal support panel 130; and thus, may be adjustable to accommodate cartons of various sizes.

A generally tubular blade 156, i.e. piercing means, is adapted to extend through a passageway 151 in the stabilizing member 142 and to pierce the distal side of the top portion 114 of the first container 112 so that the first liquid can flow out of the carton 112. Preferably, a rubber sealant 160 is arranged at an intersection between the outside diameter of the blade and the distal part of the top portion 114 of the first container 112 adjacent the passageway 151 through which the blade 156 extends. A top portion of the blade is arranged to extend into a passageway 170 formed in the mount 118. As can be appreciated, the passageway 151 in the stabilizing member 142 is aligned with the passageway 170. Additionally, the top portion of the blade 156 is securely mounted within a lower portion 166 of a nipple 162 through which the first liquid within the carton 112 will flow when being dispensed therefrom. This feature of the present invention is clearly shown in FIG. 6.

In a preferred embodiment of the measuring dispenser 110, the stabilizing member 142, shown in FIGS. 6–9, is a first container top support means such as an apex support which includes additional sized and shaped passageways therein to receive the wing nut assemblies 155A and 155B, the vertical tab 116, the plurality of piercing prongs 136, the blade 156, and the lower end or portion 166 of the nipple 162. However, it should be appreciated that the structure of the stabilizing member 142 can vary in accordance with alternate embodiments of the present invention.

As the stabilizing member 142 is an entirely novel improvement to the measuring dispenser art, one skilled in the art should appreciate that such stabilizing member may be used in many different types of measuring dispensers beyond the embodiments particularly described herein.

The operation of the trigger system of the measuring dispenser 110 is substantially similar to the operation of the measuring dispenser 10 in that the first valve means, i.e., the nipple 162, is normally arranged in a closed position within the passageway 170. The second valve means, i.e., the first plunger 184, is normally arranged in an opened position with respect to the passageway 188 in the measuring cup 176. When the trigger system is actuated, the nipple 162 is released to an opened position and the first plunger 184 is moved to a closed position. As soon as the trigger system is released to its normal position, the nipple 162 and the first plunger 184 return to their respective normal positions. Although no further details regarding the operation of the trigger system need be discussed herein, it should be understood that the first and second valve means may comprise various embodiments beyond those specifically disclosed above and in the drawings. For example, the second valve means associated with measuring cups 76 and 176 may comprise a hinge joint (not shown) instead of the first plunger 184. The hinge joint can be actuated to tilt an associated measuring cup from an upright position, i.e. a "closed" position wherein it is adapted to retain liquid therein, to a tilted position, i.e. an "opened" position wherein it is adapted to pour liquid therefrom.

In still another example of an alternative trigger system (not shown), with reference to the reference numerals of the embodiment shown in FIGS. 15, the nipple 52 would be arranged on the distal side of the rigid stopper bar 52 and the compression bar 50 would be arranged on the distal side of the nipple 52. In this arrangement, the trigger system would include two extension springs in place of compression spring 48, one on each side of nipple 52. When arranged in its normal position, the trigger system would be disposed to bias the compression bar 50 in the proximal direction toward the stopper bar 52. Further, the first plunger 74 would be disposed within the measuring cup 76 and would be spaced from the first liquid flow passageway 78 when the trigger system is arranged in the normal position. In this alternate embodiment, the lever 26 would be arranged on the distal side of the handle 24 and would be adapted to be squeezed, as opposed to being pushed, when a user desires to actuate the trigger system. Regardless of the specific structure of the various trigger system embodiments, it is important to arrange the first and second valve means so that they are alternatively actuatable as discussed hereinabove.

It should also be appreciated that the measuring cups 76 and 176 can be connected to their respective mounts 18 and 118 in other ways than those discussed above. For example, the measuring cups may be threadably mounted to an associated mount so that they can be easily removed therefrom to facilitate cleaning and to permit a user to select an appropriately sized measuring cup for a particular purpose. Similarly, the associated plunger may be removably connected to the respective trigger system so that it can be easily and thoroughly cleaned.

As aforementioned, the present invention is also directed to a second category of dispensers, which comprise more than one container, so that more than one liquids may be dispensed in a controlled manner. From these dispensers, the ones having two containers are preferred, since in most occasions, there is a strong need to a person to be able to controllably dispense no more than two liquids. A good example is the case in which the two liquids are egg-yolk and egg-white, as it will be seen later in more detail.

Figure 10:
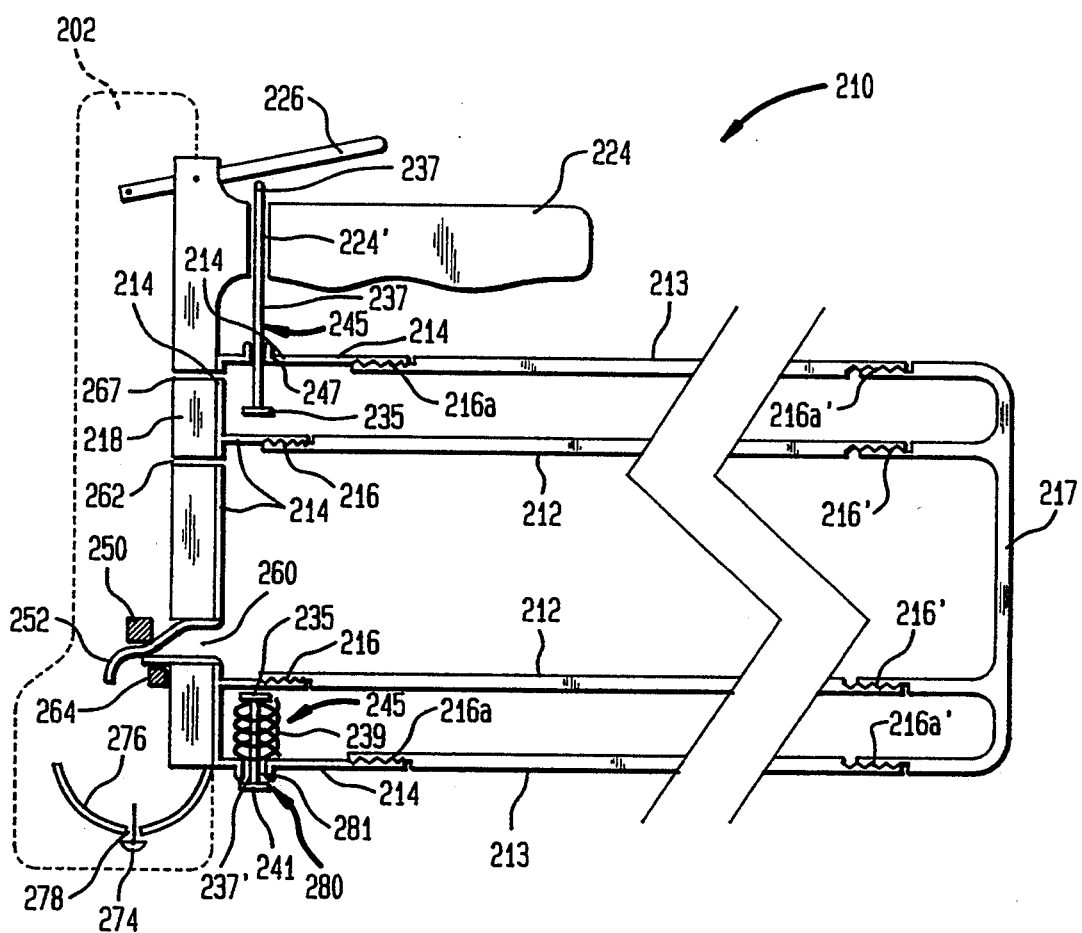
FIG. 10 is a schematic cross-sectional representation of a measuring dispenser capable of dispensing two liquids in a controllable manner, according to a different preferred embodiment of the present invention.

FIG. 10 illustrates a dispenser of the second category, which has two containers and it is intended to be capable of controllably dispensing two liquids. In FIG. 10, there is provided a dispenser 210 having a first container 212, adapted to contain a first liquid (not shown for purposes of clarity), and a supplementary container 213 adapted to contain a second liquid (also not shown for purposes of clarity). The size of each container should be selected in accordance with the controllable amounts of the two respective liquids for dispensing. There is also provided a circular lid 214 to which the two containers are connected through a pair of thread connections 216 for the first container 212, and 216a for the supplementary container 213. In FIG. 10, the threads of the lid are shown to be internal, and the threads of both containers are shown to be external. However, any combination of matching threads between each container and the lid may be used. A gasket (not shown) may also be used in combination with the threads to ensure leak-proofing. As a matter of fact, any leak-proof connection may be used in combination with or in place of the thread connections 216 and 216a.

The two containers 212 and 213 are shown in FIG. 10 to be threadably connected to each other through a bottom lid 217 with thread connections 216' and 216a'. This is preferable, as it will be discussed later, but not necessary. The containers 212 and 213 may be integrally connected to each other, or they may be completely separate entities, independent from each other.

The circular lid 214 is preferably rigidly connected to a mount 218, or it may be an integral part of it. The mount 218 has a number of elements attached to it, or being integral part of it, which elements are in the region within the dotted lines 202. For reasons of simplicity and clarity, these elements are not shown in FIG. 10, since they are the same and have the same function and operation as the ones shown in FIGS. 1 to 5. If there is a need to refer to these elements, they will be referred to by a numeral greater by 200 than the numeral used to represent the respective elements shown in FIGS. 1 to 5.

Figure 11A:
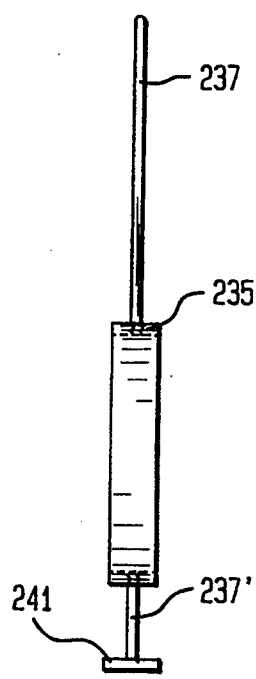
FIG. 11a shows schematically the side view of the upper and lower trigger rods of the embodiment of FIG. 10, connected through a trigger ring.
Figure 11B:
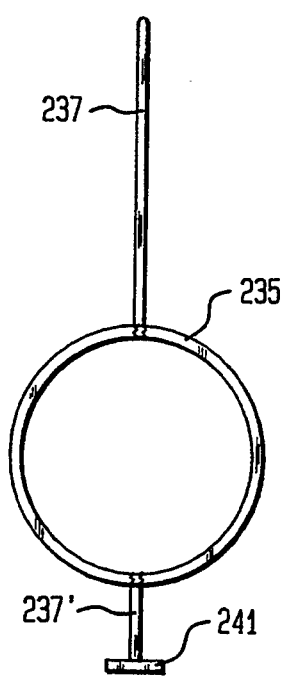
FIG. 11b shows schematically the front view of the upper and lower trigger rods of the embodiment of FIG. 10, connected through a trigger ring.

The double lid 214 comprises third valve means 280, which have a second liquid flow passageway 281 for dispensing the second liquid therethrough. A second plunger 241 is connected to a second trigger system 245, which system comprises an upper trigger rod 237 and a lower trigger rod 237' connected through a trigger ring 235, as better illustrated in FIGS. 11a and 11b. Preferably, at least one of the two trigger rods 237 and 237' is connected to the trigger ring 235 in a removable fashion; more preferably in a threadable manner. Also, the second plunger 241, may be threadably connected to the lower trigger bar 237'. A second compression spring 239, is disposed around the lower trigger rod 237' and between the trigger ring 235 and the second liquid flow passageway 281. The second compression spring 239 pushes the trigger ring 235 away from the second liquid flow passageway 281, which results in pulling the second plunger 241 toward the passageway 281 until it (241) seals it (281), and thus maintaining the third valve means in a normally closed configuration.

The upper trigger rod 237, passes through a first sealing sleeve 247, and in turn through an opening 224' of the handle 224, and ends under lever 226. In addition to a first air vent 262, which allows air to enter the first container 212, there is also provided a second air-vent 267, for allowing air to enter the supplementary container 213. The first sealing sleeve 247 may be a separate or an integral part of the double lid 214. It is preferably made of soft material or elastomeric material for discouraging any liquid from exiting therethrough.

In this embodiment, it is preferable that the first valve means through opening 260, when in open configuration, allow a liquid flow having a desirable ratio to the flow provided by the third valve means 280, when the third means are also in open configuration. The desirable flow ratio will depend on the individual liquids which are to be dispensed. If the first liquid in the first container 212 is liquid egg-yolk, for example, and if the second liquid in the supplementary container 213 is liquid egg-white, for example, it is preferable that the third valve means, when in open configuration, provide a flow rate to the second liquid in the range of 2 to 5 times, and more preferable in the range of 2.5 to 3.5 times, the flow rate provided to the first liquid by the first valve means, when in open configuration. In this embodiment, it is also preferable that the first and third valve means are concurrently in the open or in the closed configuration.

The flow rate of the first valve means may be varied be varying the dimensions of the main passageway 260, by varying the stroke of the transverse compression bar 250, or by other means of varying liquid flow, well known to the art. Also, the flow rate of the third valve means 280 may be varied be varying the dimensions of the second liquid flow passageway 281, by varying the stroke of the plunger 241 which may be regulated by the length of either one of the trigger rods 237 and 237' or by other means of varying liquid flow, well known to the art. Thus, the dispenser may be made to have a certain constant relation of flow rates, or it may be made to have changeable flow rates by allowing an operator to vary parameters affecting the flow rates, such as the ones aforementioned, for example. If the upper trigger rod 237 is connected to the trigger ring 235 threadably, for example, the distance between the upper trigger rod 237 and the lever may be varied by threading more or less the rod 237 onto the ring 235, resulting in a respective change in the stroke of the second plunger 241, which in turn alters the liquid flow accordingly. Similar effect may be achieved by threading more or less the lower trigger rod 237' onto the trigger ring 235, or by threading more or less the second plunger 241 onto the lower trigger rod 237'. Similar techniques may be used in the case of the first valve means.

For convenient assembling and disassembling the dispenser 210, it is preferable that the containers 212 and 213 are concentric.

In operation of this embodiment, the bottom lid 217 is removed, and the containers are filled, fully or partially, with the appropriate liquids. For example, the first container is filled with egg-yolk, and the second container is filled with egg-white. The bottom lid 217 is then put in place again. It goes without saying that instead of removing the bottom lid 217 for filling the containers, the operator may remove the assembly of the containers with the bottom by unscrewing said assembly from the double lid 214.

In any case, after the dispenser 210 is reassembled with the appropriate liquids in the two containers, the operator grasps said dispenser by its handle 224, and turns it in a manner that the third valve means 280 is directed downward, over the area at which the liquids are to be dispensed.

At this point, no liquid is being dispensed, since
the first valve means defined by the main passageway 260, the nipple 252, the transverse compression bar 250, and the rigid stopper bar 264, are in a normally closed configuration,
the second valve means defined by the first liquid passageway 278, and the first plunger 274 are in a normally open configuration, and
the third valve means 280 are in a normally closed configuration due to the force exerted by the second compression spring 239.

As soon as the operator desires to dispense the liquids, said operator presses on lever 226, which in turn presses on the upper trigger rod 237. This results in opening the first valve means and closing the second valve means, as already described in detail in the case of the embodiment shown in FIGS. 1 to 5. The pressure on upper trigger rod 237 causes the second plunger 241 through the ring 235 and the lower trigger rod 237' to be displaced away from the second liquid flow passageway 281, thus opening the third valve means 280.

As the second liquid, egg-white for example, is being dispensed onto the desired area, the first liquid, egg-yolk for example, is filling the measuring cup 276. When the first liquid has reached a desired level in the measuring cup 276, the operator releases the lever 226, which results in closing the first and third valve means and opening the second valve means, so that the first liquid, egg-yolk for example, is now dispensed on top of the second liquid, egg-white for example. In this manner, the operator may produce fried eggs, for example, of the "Egg McMuffin" type for example, in a convenient and accurate way. The area to which the operator dispenses the egg-liquids may be for example a circular frame on a hot cooking surface, such as a grill for example, for constricting the liquid flow and making a fried egg of the "Egg McMuffin" type.

When the liquids have been consumed, the operator may refill the dispenser in a manner similar to the one described above. As a matter of fact, the liquids may be prepackaged into double containers and just attached to the double lid 214, after a temporary lid (not shown) has been removed. Finally the dispenser may be disassembled and its parts, especially the ones coming in contact with the two liquids, be thorough cleaned.

It may be seen that the in the dispenser 210 described hereinabove, the first and third valve means are normally closed, while the second valve means are normally open. The first and third valve means in this embodiment assume the open or closed configuration concurrently, while the second valve means assume the opposite configuration than the other two.

Figure 12:
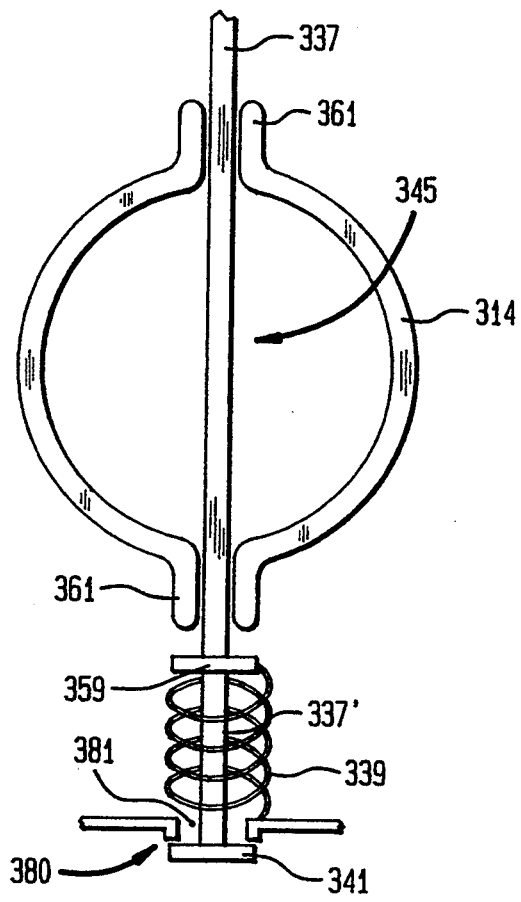
FIG. 12 shows schematically a different arrangement of the trigger rods passing through sealing sleeves on the first container.

In a different embodiment of the instant invention, better illustrated in FIG. 12, the upper trigger bar 337 and the lower trigger bar 337' are a continuation of each other, since a trigger ring is missing. Instead, the trigger rod 337 passes through a pair of second sealing sleeves 361, on the portion of the double lid 314, which is connected to the first container 312 (not shown). A stop washer 359 is located between the upper and the lower trigger rods 337 and 337' respectively, in order to allow the second compression spring 339 to bias the second triggering system 345 in a manner that the third valve means are maintained normally closed as in the previous embodiment. Some or all the different elements of the triggering system 345 may be connected to each other in a threadable configuration for easy assembling and disassembling the dispenser.

The operation of this embodiment is the same as the operation of the previous embodiment for all practical purposes.

In still another embodiment, better shown in a fragmental view in FIG. 13, the lever 426 has a wide opening 426' through which the upper trigger rod 437 is extending, and ends to a push-button 427. This arrangement allows independent operation of the first and third valve means (not shown) from each other. Still when the first valve means are in an open configuration, the second valve means are concurrently in a closed configuration, and vice versa. The first valve means and third valve means (not shown) are in a normally closed configuration, and the second valve means in a normally open configuration.

The operation of this embodiment is similar to the operation of the previous two embodiments, except that when the lever 426 is activated (pushed) or released, it bears no effect on the third valve means, which is independently affected by pushing or releasing the push button 427. Thus, in an example, the operator may initially activate the push button 427 in order to deliver egg-white through the third valve means into a round frame on the surface of a hot grill. The round frame may be used as a measure for the delivered egg-white. In sequence, the operator releases the button 427, which closes the third valve means, and activates the lever 426, which opens the first valve means, and closes the second valve means, thus delivering egg-yolk, for example, into a measuring cup (not shown) similar to cup 276 shown in FIG. 10. When the egg-yolk reaches a desired level in the measuring cup, the operator releases the lever 426, which results in closing the first valve means and opening the second valve means, thus delivering the measured amount of egg-yolk on top, for example, of the egg-white, which already has started being cooked in the round frame on the hot grill.

Another preferred embodiment, better shown in a schematic fragmental cross-sectional view in FIG. 14, is an additional example of a dispenser 510, wherein the third valve means may be operated independently of the first and second valve means. In this embodiment, the second trigger system 545 is different from the second trigger system 245 of the embodiment shown in FIG. 10 in a number of different aspects, but it serves the same purpose. In a third valve means 580, a second plunger 541 is over a second liquid flow passageway 581, and it is supported on a lower trigger rod 537' which in turn is supported on a trigger ring 535. A second compression spring 539 is adapted to apply pressure on the ring 535, which in turn forces the second plunger 541 to block the second liquid flow passageway 581, thus maintaining the third valve means 581 in a normally closed configuration. An upper trigger rod 537, also supported on the trigger ring 535, passes through the second compression spring 539, through a first sealing sleeve 547, and through handle opening 524' end finally it is connected to a pull trigger 523, with connector 587. The pull trigger 523 has a bent extension 586, slidably nesting within a slot 588 of the handle 524. It is preferable that the different elements of the second triggering system 545 are connected to each other in a removable manner, such as being threadably connected for example, for easier assembling within the dispenser, and easy disassembling for thorough cleaning, as needed.

The operation of this embodiment is very similar to the operation of the embodiment shown in FIG. 13, with the difference that the operator pulls the trigger 523 (FIG. 14), instead of pushing the button 427 (FIG. 13).

Removable parts

While the foregoing description and figures are directed toward the preferred embodiments in accordance with the present invention, it should be appreciated that numerous modifications can be made to each of the components of the measuring dispensers discussed above, including modifications on combinations of new and/or different elements encountered in each preferred embodiment. Indeed, such modifications are encouraged to be made in the materials, structure and arrangement of the disclosed embodiments of the present invention without departing from the spirit and scope of the same. Thus, the foregoing description of the preferred embodiments should be taken by way of illustration rather than by way of limitation with respect to the present invention as defined by the claims set forth below.

What is claimed is:

1. A measuring dispenser for dispensing a first liquid from a first container comprising first valve means having a normally closed configuration with respect to said first container for selectively releasing a flow of said first liquid from said first container upon opening said first valve means, metering means arranged downstream of said first valve means for receiving and selectively retaining a predetermined supply of said first liquid received from said first valve means, second valve means having a normally open configuration with respect to said first container for selectively releasing said predetermined supply of said first liquid from said metering means, and valve control means for controlling said first and second valve means so as to selectively actuate said first valve means from said closed configuration to an open configuration upon simultaneously actuating said second valve means from said open configuration to a closed configuration, said dispenser also comprising a supplementary container adaptable to contain and dispense a second liquid, the supplementary container comprising third valve means having a normally closed configuration for selectively releasing a flow of the second liquid from the supplementary container upon opening the third valve means[.],the third valve means obtaining the open and closed configuration substantially concurrently and respectively with open and closed configuration of the first valve means, so that the first liquid is dispensed after the second liquid has been dispensed.

2. The dispenser of claim 1, wherein the third valve means are adaptable, when in open configuration, to provide a flow rate to the second liquid in a desired ratio with respect to the flow rate provided to the first liquid by the first valve means, when in open configuration.

3. The dispenser of claim 2, wherein the third valve means, when in open configuration, provide a flow rate to the second liquid in the range of 2 to 5 times the flow rate provided to the first liquid by the first valve means, when in open configuration.

4. The dispenser of claim 2, wherein the third valve means, when in open configuration, provide a flow rate to the second liquid in the range of 2.5 to 3.5 times the flow rate provided to the first liquid by the first valve means, when in open configuration.

5. The dispenser of claim 2, wherein the first liquid is egg-yolk, and the second liquid is egg-white.

6. The dispenser of claim 5, wherein the supplementary container is concentric with and surrounds the first container.

* * * * *